United States Patent
Chen

(10) Patent No.: US 6,753,983 B2
(45) Date of Patent: Jun. 22, 2004

(54) TIME-SAVING CALIBRATION METHOD OF A SCANNER

(75) Inventor: Michael Chen, Hsinchu (TW)

(73) Assignee: Avision Inc., Hsin-Chu Hsien (TW)

( * ) Notice: Subject to any disclaimer, the term of this patent is extended or adjusted under 35 U.S.C. 154(b) by 345 days.

(21) Appl. No.: 09/682,302

(22) Filed: Aug. 16, 2001

(65) Prior Publication Data

US 2003/0035155 A1 Feb. 20, 2003

(51) Int. Cl.⁷ .............................. H04N 1/04; H04N 1/00
(52) U.S. Cl. ...................... 358/474; 358/497; 358/406
(58) Field of Search ................... 358/406, 504, 358/475, 509, 497, 494, 486, 488, 487, 506, 461, 449, 451, 453, 464; 382/272, 274; 359/210; 399/211, 376, 370, 371

(56) References Cited

U.S. PATENT DOCUMENTS 5,801,962 A * 9/1998 Sheu et al. ................. 358/406
5,969,845 A * 10/1999 Tsai ........................... 359/497
6,388,778 B1 * 5/2002 Ko-Chien ................... 358/497

* cited by examiner

Primary Examiner—Cheukfan Lee
(74) Attorney, Agent, or Firm—Winston Hsu

(57) ABSTRACT

A scanning method that saves time by reducing calculations performed in a scanner. The scanner has a housing, a transparent platform installed on the housing, a document positioned on the transparent platform, a scanning module, a calibration paper, a memory, and a processor. If an effective image range has been determined within a predetermined amount of time after the scanner is turned on, the effective image range will not be redefined before scanning the document.

7 Claims, 4 Drawing Sheets

TIME-SAVING CALIBRATION METHOD OF A SCANNER

BACKGROUND OF INVENTION

1. Field of the Invention

The present invention relates to a scanning method, and more particularly, the present invention discloses a scanning method that reduces a number of calculations performed during calibration to save time.

2. Description of the Prior Art

Scanning devices are peripherals commonly found in home and office computing systems. Scanners are capable of determining image content of a document, and converting the image content of the document into a form that may be manipulated by a computer user through various related software packages. Practically, this manipulation may include converting image data of old documents into text data for database use, or changing image content of a scanned photograph for tabloid use.

Whatever the use, prior art scanners spend an inordinate amount of time warming up and performing self-calibration. In one aspect, calibration is performed to improve image scans by calculating, and eventually correcting for, differences in light source intensities over the length of the light source.

Please refer to FIGS. 1–3. FIG. 1 is a diagram of a prior art scanner 10. FIG. 2 is a graph of a distribution of intensity data, with an average intensity 32 demarcated. FIG. 3 is a graph showing light intensities relative to a position along a calibration paper 20 of the scanner 10, including a reference to the average intensity 32 of FIG. 2. As shown in FIG. 1, the scanner 10 also comprises a scanning module 12 for retrieving data from a document 14, a transparent plate 16, upon which the document 14 may be placed, a memory 17 for storing programs and data, and a central processing unit (CPU) 19 for processing data retrieved from the document 14. The calibration paper 20 is positioned before the document 14, relative to a direction of movement of the scanning module 12.

Please refer to FIG. 4, which is a flow chart of the prior art scanning method. Before scanning the document 14, the scanning module 12 performs a calibration scan. In the calibration scan, the scanning module 12 scans the calibration paper 20. Upon completion of the calibration scan, the CPU 19 receives data such as that shown in FIG. 2. Again, FIG. 2 shows a distribution of intensities. The CPU 19 removes upper and lower 5% of the intensity distribution data to form a range of acceptable intensities, which will also be referred to as an effective image range of the image data. Only data falling within the effective image range are used in calculating the average 32.

As shown in FIG. 3, light intensities of the light source typically vary over the width of the transparent plate 16. Therefore, the CPU 19 lifts or drops the intensity of each scanned pixel to the intensity level of the average 32.

Again, one calibration scan is performed before every scan of the document in this prior art method. Then, the CPU 19 both determines the effective image range of the image data, and calculates the average 32. This adds significant time when a user performs multiple scans, because the CPU 19 embedded in the scanner 10 is typically slow.

SUMMARY OF THE INVENTION

It is therefore an objective of the present invention to provide a scanning method that saves time.

According to the first claimed invention, the scanning method saves time by reducing processor calculations. The scanner has a housing, a transparent platform installed on the housing, a document positioned on the transparent platform, a scanning module, a calibration paper, a memory, and a processor. The scanning method starts by having the scanning module to scan the calibration paper. If no scanning pass has been performed since the scanner is turned on or if a period of time, since generating a last effective image range determined after the scanner is turned on and before scanning the calibration paper, has elapsed, define a new effective image range according to the image data of the plurality of pixels and calculate an average of image data which are within the new effective image range. If the period of time, since generating the last effective image range, has not elapsed, calculate an average of image data which are within the last effective image range. The scanning module then uses the average to calibrate an image generated by scanning the document.

According to the second claimed invention, the calibration paper is scanned to collect the image data, the effective image range is defined according to the data, and the average is calculated according to the effective image range. Then, before beginning a scanning pass, it is determined whether or not the calibration paper should be scanned. If not, the image generated by scanning the document is calibrated according to the previously calculated average.

It is an advantage of the claimed invention that number of calculations performed by the processor is greatly reduced, which saves a great amount of time in processing due to the slow speed of the processor.

These and other objectives of the present invention will no doubt become obvious to those of ordinary skill in the art after reading the following detailed description of the preferred embodiment, which is illustrated in the various figures and drawings.

DETAILED DESCRIPTION

Figure 1:
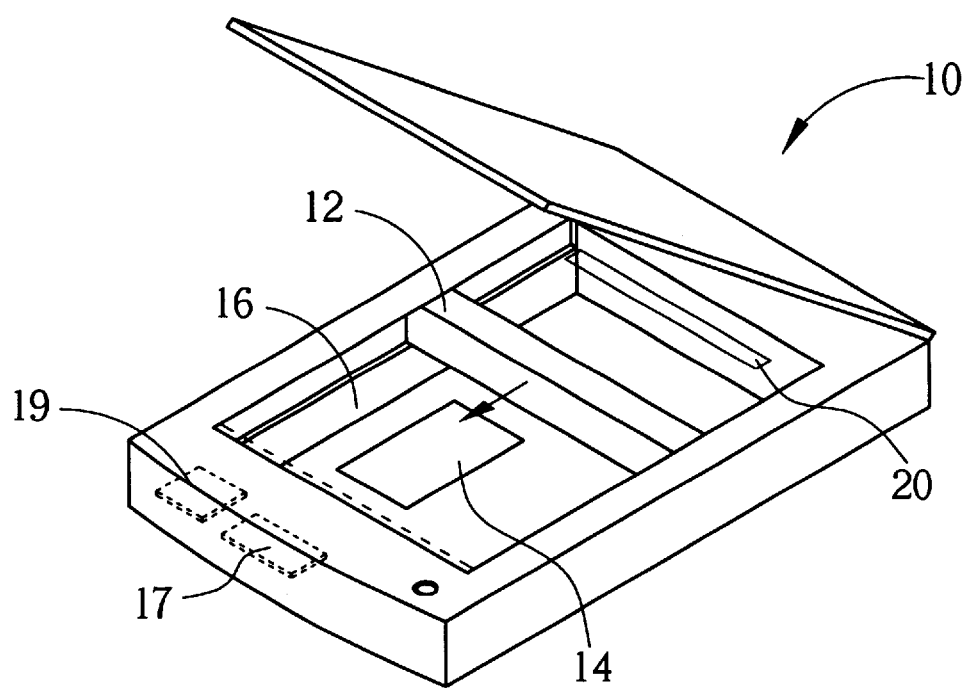
FIG. 1 is a diagram of a scanner, according to the prior art.
Figure 2:
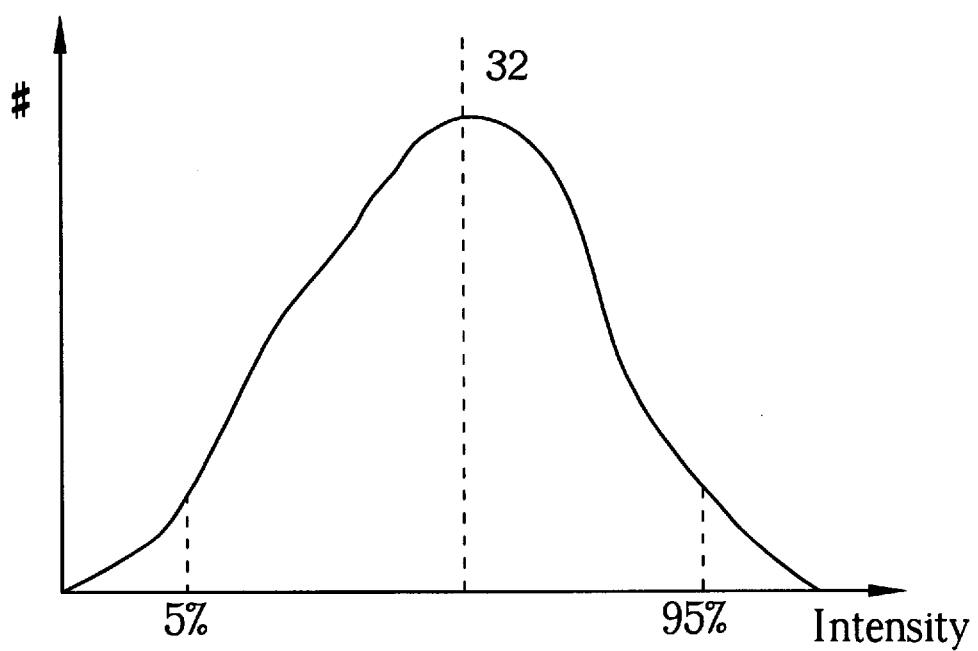
FIG. 2 is a graph of a distribution of intensity data, with an average intensity demarcated, according to the prior art.
Figure 3:
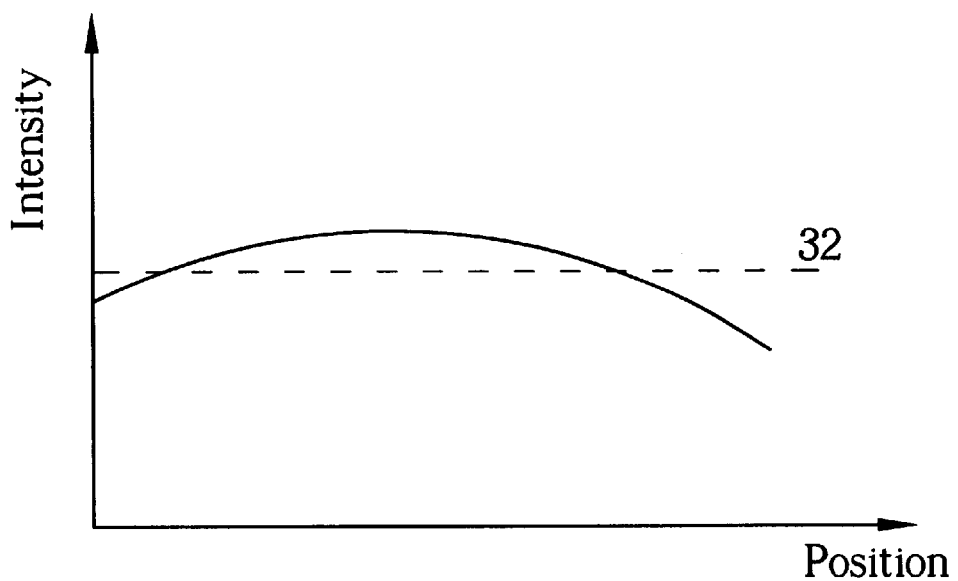
FIG. 3 is a graph showing light intensities relative to a position along the calibration paper, including a reference to the average intensity of FIG. 2, according to the prior art.
Figure 4:
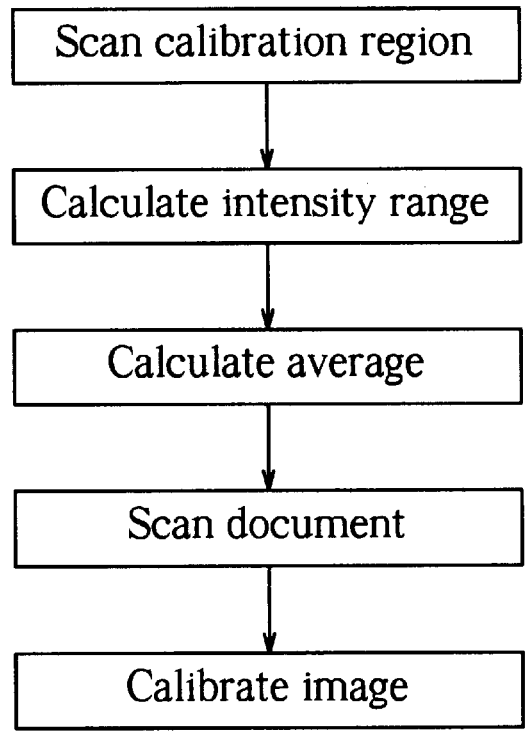
FIG. 4 is a flow chart of a scanning method according to the prior art.

The prior art scanner 10 shown in FIG. 1, and prior art intensity diagrams shown in FIGS. 2 and 3 all are transferable to the present invention scanning method, so continued reference is made to these figures in describing the preferred embodiments. In addition, the method for defining an effective image range that was described in the prior art discussion will also be used with the present invention.

Figure 5:
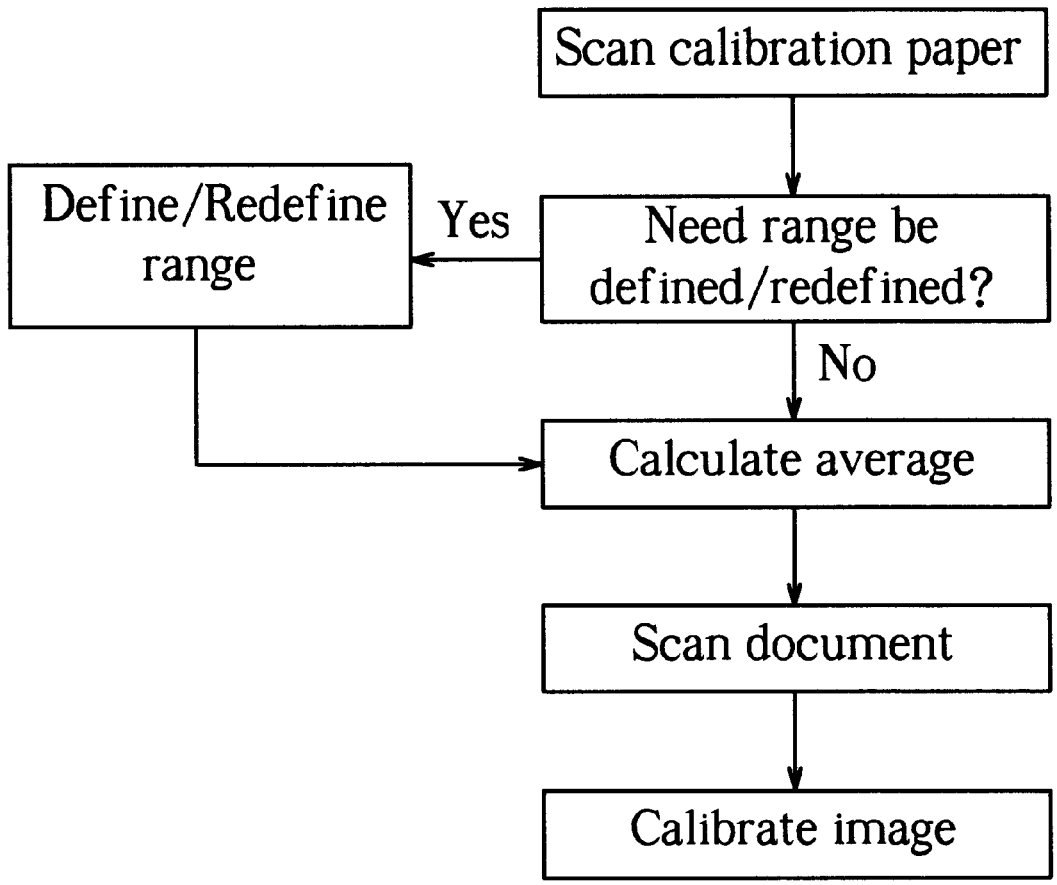
FIG. 5 is a flow chart of a first scanning method according to the present invention.

Please refer to FIG. 5, which is a flow chart of a first scanning method according to the present invention. The first method begins by scanning the calibration paper 20 so as to collect image data of a plurality of pixels in the calibration paper 20. Before performing a first scanning pass after the scanner 10 is turned on, an effective image range is defined according to the image data. And an average of image data which are within the effective image range is calculated. The document 14 is then scanned and calibrated using the average. Before performing a following scanning pass while the scanner 10 is still turned on, the calibration paper 20 is scanned again. At this point, if a period of time, such as 30 minutes, since generating the effective image range has not elapsed, a new average 32 of image data collected by rescanning the calibration paper 20 and falling within the effective image range determined before performing the first scanning pass is calculated. If the period of time since generating the effective image range has elapsed, a new effective image range is defined by using image data collected from rescanning the calibration paper 20. And a new average 32 is calculated by using image data collected from rescanning the calibration paper 20 and falling within the new effective image range. After calculating the new average 32, the following scanning pass is performed, and the resulting image is calibrated according to the new average 32.

The method checks for a period of elapsed time of 30 minutes, because most scanning modules of scanning devices do not exhibit a significant change in intensity variation over their length in such a short period of time. Of course, this interval of time is not limited to 30 minutes. The period of elapsed time can be longer or shorter.

Figure 6:
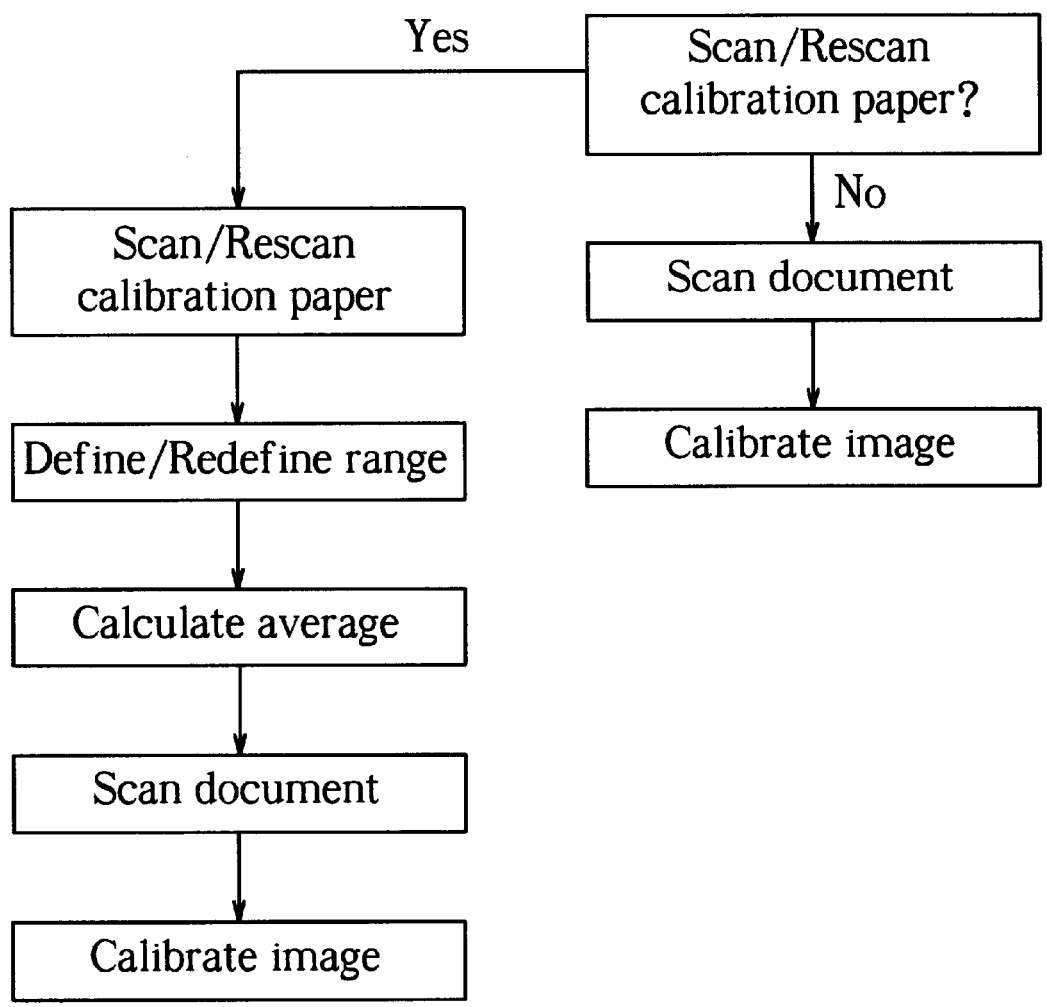
FIG. 6 is a flow chart of a second scanning method according to the present invention.

Please refer to FIG. 6, which is a flow chart of a second scanning method according to the present invention. In the second scanning method, the calibration paper 20 is scanned to collect image data of a plurality of pixels. The collected image data is then used to define an effective image range. The average 32 is then directly calculated from image data falling within the effective image range. Before performing a scanning pass, detection is performed to determine whether or not the calibration paper 20 need be scanned again. If not, then the document 14 is scanned, and the resulting image is calibrated according to the average 32. If so, the calibration paper 20 is rescanned and image data of the collected pixels are used to define a new effective image range and a new average. The resulting image and images generated within next 30 minutes (the period of elapsed time) if the scanner 10 is still turned on are calibrated according to the new average.

Basically, the effective image range and the average need be redefined when the scanning pass to be performed is a first scanning pass after the scanner 10 is turned on, or a previous average has been determined for more than the period of elapsed time.

Based on an assumption that light intensity of a scanning module does not change significantly over short periods of time, if an effective image range has been determined within a predetermined amount of time after the scanner 10 is turned on, the first scanning method does not re-determine an effective image range, and the second scanning method does not perform a calibration scan before scanning the document. Compared with the prior art method, the number of calculations handled by the slow CPU is reduced in both scanning methods of the present invention, which saves a significant amount of time.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A scanning method for a scanner, the scanner comprising:
   a housing;
   a transparent platform installed on the housing for a document to be placed on;
   a calibration paper positioned at a front end of the transparent platform;
   a scanning module installed inside the housing for scanning the document;
   a memory for storing programs and data; and
   a processor for controlling operations of the scanner;
   the scanning method comprising the following steps:
   a) driving the scanning module to scan the calibration paper to collect image data of a plurality of pixels;
   b) if no scanning pass has been performed since the scanner is turned on or if a period of time, since generating a last effective image range determined after the scanner is turned on and before performing step (a), has elapsed, defining a new effective image range according to the image data of the plurality of pixels and calculating an average of image data which are within the new effective image range; if the period of time, since generating the last effective image range determined after the scanner is turned on and before performing step (a), has not elapsed, calculating an average of image data which are within the last effective image range; and
   c) scanning the document and using the average calculated in step (b) to calibrate an image of the document generated by scanning the document.

2. The scanning method of claim 1 wherein step (a) is performed before performing a scanning pass.

3. The scanning method of claim 1 wherein the effective image range has an upper limit and a lower limit stored in the memory.

4. A scanning method for a scanner, the scanner comprising:
   a housing;
   a transparent platform installed on the housing for a document to be placed on;
   a calibration paper positioned at a front end of the transparent platform;
   a scanning module installed inside the housing for scanning the document;
   a memory for storing programs and data; and
   a processor for controlling operations of the scanner;
   the scanning method comprising:
   a) driving the scanning module to scan the calibration paper to collect image data of a plurality of pixels, defining an effective image range according to the image data of the plurality of pixels, and calculating an average of image data which are within the effective image range and are collected from scanning the calibration paper; and
   b) before beginning a scanning pass, detecting if the scanning module should be driven to rescan the calibration paper; if the scanning module need not be driven to rescan the calibration paper, then calibrating the image generated by scanning the document according to the average calculated in step (a).

5. The scanning method of claim 4 wherein step (a) is performed before performing a first scanning pass after the scanner is turned on, and performed before beginning a scanning pass which is to be performed after a previous average has been determined for more than a period of elapsed time.

6. The scanning method of claim 4 wherein in step (b), if the scanning module need not be driven to rescan the calibration paper, then a last average calculated in step (a) is used to calibrate the image generated by scanning the document.

7. The scanning method of claim 4 wherein the effective image range has an upper limit and a lower limit stored in the memory.

* * * * *